US006383548B1

(12) United States Patent
Holt et al.

(10) Patent No.: US 6,383,548 B1
(45) Date of Patent: May 7, 2002

(54) COBY PRODUCTS AND A PROCESS FOR THEIR MANUFACTURE

(75) Inventors: Gregory A. Holt, Brownfield; Joseph W. Laird, Lubbock, both of TX (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/611,615

(22) Filed: Jul. 7, 2000

(51) Int. Cl.$^7$ ................................................. A23K 1/14
(52) U.S. Cl. ...................... 426/635; 426/661; 426/807
(58) Field of Search ................................ 426/635, 661, 426/807

(56) References Cited

U.S. PATENT DOCUMENTS

| | | | | |
|---|---|---|---|---|
| 3,923,005 A | * | 12/1975 | Fry et al. ........................ | 119/1 |
| 4,206,718 A | * | 6/1980 | Brewer ........................... | 119/1 |
| 4,676,196 A | * | 6/1987 | Lojek et al. .................... | 119/1 |
| 4,727,824 A | * | 3/1988 | Ducharme et al. ............. | 119/1 |
| 4,883,021 A | * | 11/1989 | Ducharme et al. ............. | 119/1 |
| 5,176,879 A | * | 1/1993 | White et al. .................... | 422/5 |
| 5,204,102 A | * | 4/1993 | Coles et al. ............. | 424/195.1 |
| 5,391,371 A | | 2/1995 | Jacobsen et al. .............. | 424/94 |
| 5,637,312 A | * | 6/1997 | Tock et al. .................. | 424/438 |
| 5,750,466 A | | 5/1998 | Wedegaertner et al. ..... | 504/100 |
| 5,773,070 A | | 6/1998 | Kazemzadah ................ | 426/573 |
| RE35,964 E | | 11/1998 | Wellons .......................... | 426/2 |
| 5,871,802 A | | 2/1999 | Gao et al. .................... | 426/635 |

OTHER PUBLICATIONS

White, E. H., et al., "Conversion of Cotton Plant and Cotton Gin Residues to Fuels by th eExtruder Feeder Liquefaction Process", *Biosource Technology*, 34, 1996, pp. 117–123.

Laird, Weldon, et al., "Water and Starch Rates for Coating Cottonseed", Proceedings of the Beltwide Cotton Conference, vol. 2, pp. 1718–1720, Jan. 1998, National Cotton Council, Memphis, TN.

Laird, J.W., et al., "Coating Cottonseed for Improved Flow in Grain Handling Equipment", Cotton Ginning Journal, 1997–1998.

Laird, Weldon, et al., "Engineering Factors for Coating and Drying Cottonseed to Create a Flowable Product", Written for Presentation at the 1997 ASAE Annual International Meeting Sponsored by ASAE, Minneapolis, MN, Aug. 10–14, 1997.

Karpiscak, Martin M., et al., "Densification of Cotton Gin Trash into Fireplace Fuel", A paper presented by the Symposium on Utilization Alternatives for Cotton Gin Trash, Apr. 8, 1982, Lubbock, TX.

\* cited by examiner

*Primary Examiner*—Chhaya D. Sayala
(74) *Attorney, Agent, or Firm*—M. Howard Silverman; Randall E. Deck; John D. Fado

(57) ABSTRACT

A novel method for the treatment of cotton byproducts to yield value-added products while reducing the wear on processing equipment is described. In this process, cotton byproducts or waste are ground and compacted, and treated with a gellable polysaccharide. The polysaccharide is gelatinized, either before or concurrent with the grinding and compaction of the cotton byproducts. The resultant byproducts exhibit significantly reduced abrasiveness, greatly reducing the wear on equipment.

21 Claims, 2 Drawing Sheets

COBY PRODUCTS AND A PROCESS FOR THEIR MANUFACTURE

BACKGROUND OF THE INVENTION

1. Field of the Invention

The invention relates to a novel process for transforming cotton byproducts into useful value-added products.

2. Description of the Prior Art

Utilizing the 2.5 million plus tons (calculated from data in 1997 Census of Agriculture) of byproducts from cotton gins has been a topic of research for years. Some of this research has focused on various applications ranging from using cotton gin byproducts (CGB) as fire logs (Karpiscak et al., 1982, Densification of cotton gin trash into fireplace fuel., Proc. of the Symposium of Cotton Gin Trash Utilization Alternatives, National Science Foundation et al., pp. 87–99.), an energy source (Beck and Clements, 1982, Ethanol production from cotton gin trash. Proc. of the Symposium of Cotton Gin Trash Utilization Alternatives, National Science Foundation et al., pp. 163–181; Lacewell et al., 1982, Pelleting cotton gin trash for energy. Proc. of the Symposium of Cotton Gin Trash Utilization Alternatives, National Science Foundation et al., pp. 141–161; LePori et al., 1982, Energy from cotton gin trash, Proc. of the Symposium of Cotton Gin Trash Utilization Alternatives, National Science Foundation et al., pp. 101–117; Parnell et al., 1991, Converting cotton gin trash into usable energy technical and economical considerations, Proc. Beltwide Cotton Conferences 2:969–972; White et al. 1996, Conversion of cotton plant and cotton gin residues to fuels by the extruder-feeder liquification process. Bioresource-Technology 56:1, 117–123), livestock feed (Holloway et al., 1974, Feeding gin trash to beef cattle, Bulletin Mississippi Ag. Exp. Stn. 818, 9p; Conner and Richardson, 1987, Utilization of cotton plant residues by ruminants, Journal of Animal Science 65(4) 1131–1138; Poore and Rogers, 1995, Feeding whole cottonseed and other cotton by-products to beef cattle, Veterinary-Medicine 90:11, 1077–1087), raw materials in asphalt roofing products (Kolarik and Smith, 1978, Economic evaluation of south plains (Texas) ginning waste as a raw material in the production of roofing felt, Report prepared for Cotton Incorporated, Agreement No. 78-383, 72p), and compost (Hills, 1982, Composting gin trash in California, Proc. of the Symposium of Cotton Gin Trash Utilization Alternatives, National Science Foundation et al., pp. 63–86; Shumack et al., 1991, Using gin trash in composted soil ingredients, Proc. Beltwide Cotton Conferences 1: 498–499; Truhett, 1994, Developing markets for composted gin waste, Proc. Beltwide Cotton Conferences 1:609; Ayers, 1997, Farmer composting of cotton gin trash, Proc. Beltwide Cotton Conferences 2: 1615–1616). The amount of research that has been performed on this subject is more extensive than indicated in the examples above. For a more thorough overview of previous research efforts, refer to Thomasson (1990, A review of cotton gin trash disposal and utilization, Proc. Beltwide Cotton Conferences 689–705). One of the major obstacles encountered when trying to utilize CGB in the past has been the maintenance and operational cost associated with processing the product. CGB by their very nature contain varying amounts of sand and dirt depending on the crops geographical location, method of harvest, and other factors. Due to the quantity of soil particles (primarily sand) that have been traditionally associated with CGB's, excess wear of the processing equipment occurred. This necessitated the need to "clean" the byproduct prior to use. The idea of cleaning/screening the CGB to remove the sand and dirt in an effort to enhance its value has been a point of emphasis in studies throughout the literature (Young and Griffith, 1976, Economics of using gin trash in feedlot rations, Texas High Plains, Texas Tech University, College of Agricultural Sciences, Publication no. T-1-146, 18 pp.; Kolarik, et al., 1978, Cotton gin waste in Texas, Cotton Gin and Oil Mill Press, November, pp. 14–16; Axe et al., 1982, Feeding value of cleaned and uncleaned cotton gin trash, Proc. of the Annual Meeting of the American Society of Animal Science Western Section, American Society of Animal Science, 33:57–59). However, even with the best cleaning systems, not all the sand was removed. As stated in Kolarik et al. (1978, ibid), the most opportune place to remove dirt and sand is in the pre-cleaning stages at the cotton gin. However despite these advances, the need persists for improved processes for reducing the wear on equipment.

SUMMARY OF THE INVENTION

We have now discovered a novel method for the conversion of cotton waste to value-added products while reducing the wear on processing equipment. In this process, cotton byproducts which are ground and compacted are also treated with a gellable polysaccharide. This polysaccharide is gelatinized, either before or concurrent with the grinding and compaction of the cotton byproducts. The resultant products exhibit significantly reduced abrasiveness, greatly reducing the wear on equipment.

In accordance with this discovery, it is an object of this invention to provide a process for mitigating the effect of the abrasiveness of cotton byproducts.

Another object of this invention is to provide an improved process for transforming cotton byproducts into value-added products.

Yet another object of this invention is to provide an improved process for transforming cotton byproducts into a fuel, fertilizer, mulch or livestock feed.

Other objects and advantages of this invention will become readily apparent from the ensuing description.

DETAILED DESCRIPTION OF THE INVENTION

Figure 1:
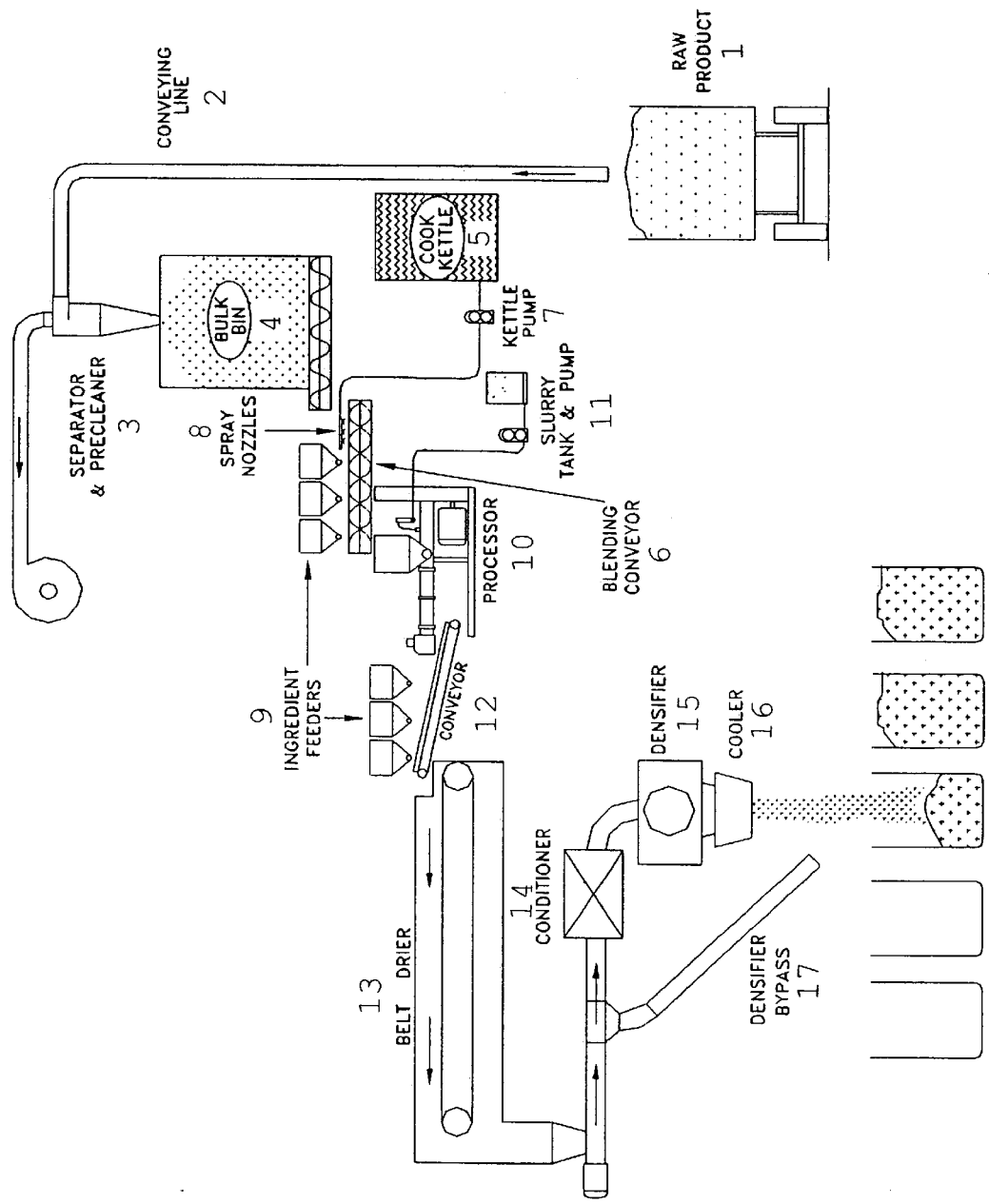
FIG. 1 shows a schematic diagram of one preferred embodiment of the process.

The abrasiveness of cotton byproducts has been one of the major cost factors associated with value-added processes. The cost associated with cleaning and the wear of the equipment can often times amount to half the total cost of processing alone. The method of the invention described herein, which may also be referred to as the COBY (COtton BYproducts) process, significantly reduces the abrasiveness of the cotton byproducts, consequently reducing the wear on processing equipment. The method is a value-added operation to produce either a livestock feed, fertilizer, fuel, and/or mulch from cotton byproducts utilizing the same basic equipment. The method may be used for the treatment of cotton byproducts obtained from a variety of cotton processing facilities, including but not limited to cotton gins, textile mills, and oil mills. Depending upon the particular source selected, these byproducts primarily consist of one or more of burs, sticks, leaves, short staple lint (i.e., naps), immature seeds, seed hulls, and seed coat fragments.

In brief, a mass of cotton byproducts described above is treated with a gellable polysaccharide, and subsequently or concurrently ground and compacted. This polysaccharide is also gelatinized, either prior to the treatment of the byproducts or during their grinding and compaction, yielding a value-added product which is substantially less abrasive.

A variety of gellable polysaccharides are known in the art and may be used herein. Generally, suitable polysaccharides include naturally occurring and modified polysaccharides which gelatinize when hydrated and/or cooked. Although starch is preferred, other suitable polysaccharides include but are not limited to modified starch, cellulose and modified cellulose, particularly cellulose ethers, and plant, algal or microbial gums. It is understood that as used herein, the term "starch" includes starch which is substantially pure or impure, as well as flour. The starch may be obtained from a variety of sources, such as wheat, oats, rye, barley, corn, tubers, potatoes or tapioca. Modified starch and modified cellulose include starch and cellulose which have been derivatized or modified by conventional processes known in the art, such as esterification, etherification, oxidation, acid hydrolysis, cross-linking, and enzyme conversion. Representative non-limiting examples of modified starch, modified cellulose, and gums which may be used as well as techniques for their production include dextrin, carboxymethylcellulose, hydroxyethylcellulose, dextran, xanthan gum, guar gum, and locust bean gum. Still other starches (including modified starches), celluloses (including modified celluloses), and gums which may be used herein are described, for example, in the Kirk-Othmer Encyclopedia of Chemical Technology (fourth edition, John Wiley & Sons, New York, 1997, see vol. 5, p. 541–563, vol. 12, pp. 842–860, and vol. 22, pp. 699–716), and by Rutenberg et al. (Starch Derivatives: Production and Uses, IN: Starch:Chemistry and Technology, second edition, Whistler et al. (ed.), Academic Press, 1984, chapter 10), the contents of each of which are incorporated by reference herein.

Grinding and compaction of the byproducts may be conducted in an extruder, expeller, mill, grinder, breaker or crusher as is known in the art. The degree of grinding and compaction is not critical, and will typically vary with the particular desired value added product, but should be sufficient to increase the bulk density of the mass of byproducts. In the preferred embodiments, the bulk density of the cotton byproducts (without added polysaccharide) is increased by about 40% or more, most preferably by about 70% or more, relative to the unprocessed byproducts.

In one particularly preferred embodiment the byproducts are processed (i.e., ground and compacted) in an extruder or expeller. Use of extruders and expellers is typically preferred for those applications involving preparation of animal feeds, fertilizers, and mulch. As described in greater detail hereinbelow, processing in these devices allows the byproducts to be granulated and compacted, with concurrent heating of the cotton byproducts and the polysaccharide at elevated temperatures sufficient to sterilize the byproducts and kill any fungal spores, disease pathogens, and seeds therein, and/or to gelatinize the added polysaccharide. A variety of extruders and expellers may be used in the process of this invention. Examples of suitable extruders include but are not limited to those described by Harper (Extrusion of Foods, Vol. I, CRC Press, Boca Raton, Fla., 1981, the contents of which are incorporated by reference herein).

Alternatively, in another embodiment, use of other processing equipment, such as a roller mill, hammer mill or tub grinder, is preferred for the preparation of fuels wherein sterilization is of no added benefit. It is also envisioned that other mills, crushers, breakers or grinders known in the art for particle size reduction may be used herein, including but not limited to those described by Snow et al. (Size Reduction and Size Enlargement, IN: Chemical Engineer's Handbook, Perry and Chilton (ed.), fifth edition, McGraw-Hill, New York, 1973, pp. 8-1 through 8-8-65, the contents of which are incorporated by reference herein. Note pp. 8-16 through and 8-56). However, the skilled practitioner will recognize that products requiring sterilization may still be processed in such equipment by addition of an additional upstream or downstream cooker.

Treatment of the byproducts with the gellable polysaccharide, may be conducted before processing, during processing, or both. Similarly, the polysaccharide may gelatinized at any time before or during the process of the invention, including prior to treatment of the byproducts therewith, or before, during or after processing of the byproducts, or a combination thereof. In any event, the total amount of polysaccharide added should be effective to significantly reduce the abrasiveness of the ground and compacted byproducts relative to an untreated control lacking added polysaccharide. The actual amount used may vary with the particular polysaccharide selected, the desired end product, and the composition of the raw byproducts (e.g., the relative ratio of burs, sticks, leaves, short staple lint, and immature seeds therein) and may be readily determined by the practitioner skilled in the art. A number of techniques for measuring abrasiveness have been previously described and are suitable for use herein and include, for example, the determination of the Average Abrasion Index as described by Snow et al. (Size Reduction and Size Enlargement, IN: Chemical Engineer's Handbook, ibid, note pp. 8-9 and 8-10), or the use of the ASTM Standards (Vol. 03.02. 1994, G 65–94, Metal wear and erosion; metal corrosion—Measuring abrasion using the dry sand/rubber wheel apparatus, West Conshohocken, Pa.), or by the European Committee for Standardization (1998, EN 12373-9, Aluminum and aluminum alloys-Anodizing-Part 9: Measurement of wear resistance and wear index of anodic oxidation coatings using an abrasive wheel wear test apparatus, Brussels, Germany). Without being limited thereto, in the preferred embodiment using starch, the total amount of starch added to the product should be greater than or equal to approximately 3% (by weight, raw dry starch), more preferably between approximately 3 to 20%, and is most preferably approximately 8%. Concentrations greater than 20% may be used, although it is generally not cost effective. The practitioner skilled in the art will also recognize that water or other liquid should be added to the polysaccharide in an amount effective to effect gelatinization. The precise amount of water added may be readily determined, and will vary with the particular polysaccharide used, the gelatinization conditions, the presence and type of additional components, and the composition of the raw byproduct (if gelatinization is conducted after the polysaccharide is combined with the raw byproduct).

As mentioned above, the processing conditions, including temperature and pressure, will of course vary with the desired end product, the particular processor used, and the specific polysaccharide added and its condition (i.e., pregelatinized or non-gelatinized). For instance, when producing fertilizers, mulches and feeds, heating is typically preferred to sterilize the cotton byproducts, killing any bacteria, fungi, and/or weeds present in the raw byproducts. Cooking at these elevated temperatures will also gelatinize the added polysaccharide, and in animal feed applications will also increase digestibility of the product. Without being limited thereto, in this embodiment, when processing in an extruder or expeller, the temperature is therefore preferably greater than or equal to approximately 220° F., particularly between about 220–260° F., most preferably between about 230–250° F. although lower temperatures may be used, weed seeds may not be killed. Where sterilization is either not necessary or otherwise not desired, as in the production of fuel, cooking at elevated temperature need only be sufficient to gelatinize the added polysaccharide, and may be omitted if preqelatinized polysaccharide is utilized. When adding non-gelatinized starch, the temperature may vary widely depending upon the source of the starch, but is usually between about 120–200° F., more typically between about 180–190° F.

A variety of optional agents may be added to the byproducts before or after processing. For example, when producing animal feeds, additional protein, carbohydrate, fat, oil, vitamin, and/or mineral supplements may be added to improve the nutrient quality or palatability of the feed. Other adjuvants such as preservatives or medicaments for the treatment of animals may also be added. When producing fertilizers or mulch, supplemental fertilizers such as urea or phosphorous, herbicides, and/or insecticides may be added.

FIG. 1 shows a schematic diagram of one preferred embodiment of the invention using starch as the gellable polysaccharide and wherein a first portion of the starch is gelatinized prior to combination with the cotton byproducts, while a second portion of non-gelatinized starch is added to the byproducts and is gelatinized concurrently with the processing in the extruder. The raw cotton gin byproduct or CGB 1 is transported via a conveying line 2 to an optional separator or precleaner 3 for removing sand, soil and/or rocks. Precleaning may be omitted if the raw byproduct is substantially free of such debris or has been previously cleaned. Suitable precleaners include cyclones, rotary drum filters, vibratory sieves, separators, screens, or condensers. From the precleaner 3, the CGB is conveyed into a live-bottom bulk storage bin 4. This bin preferably includes an adjustable feed rate which may be varied with the process rate of the equipment.

A starch/water mixture is heated in cook kettle 5 to a temperature to the ideal range of 180 to 190° F. to effect gelatinization. If gelatinization is to be conducted in processor 10, or if preqelatinized starch is used, cook kettle 5 may be omitted. Also, the cook kettle is where some ingredients such as molasses, urea, liquid phosphate, calcium carbonate, meal (guar, corn, soybean, or the like) may be added. However, any components added at this point should be soluble in the starch solution and be conveyed in a liquid state to provide the desired distribution without separating out. In this embodiment, the starch/water mixture is preferably about 1 pound of starch per 1 gallon of water. This ratio may range from 0.75 to 1.5 pounds of starch per gallon of water depending upon the type and quality of starch as well as any other ingredients added in the kettle.

From the bulk storage bin 4, the CGB are fed to an optional blending conveyor 6 for premixing the CGB, starch, and other components. The gelatinized starch mixture from cook kettle 5 is conveyed with pump 7 to spray nozzles 8 and applied to the CGB in the conveyor 6. The blending conveyor 6 carries the product under optional ingredient feeders or hoppers 9 which may be used to apply liquid or solid additives. In this embodiment, one of the hoppers is most commonly used to apply dry starch (4 to 6% by weight) to the product after the liquid starch mixture has been applied prior to the processor. Guar meal (dry) and dry molasses are other additives added prior to the processor to increase crude protein and palatability when making a feed. In the hoppers upstream of the processor, the amount of any dry product added should not drop the moisture content of the material below that required to operate the processor (e.g., about 20% in the extruder of this embodiment) or become a solid when cooked. In the hoppers 9 downstream of the processor, the additives should not be volatile in temperatures above 250 deg. F. and should not increase the moisture content above that which would significantly reduce the effectiveness of the processor (e.g., about 40% in this embodiment). An optional slurry tank & pump 11 may also be provided for application of small quantities of liquid based or soluble additives to the CGB in the processor 10. When used, the moisture content of the product in the processor should stay below 45% maximum (in this embodiment), and the ideal range would be 30 to 40% moisture.

The blending conveyor 6 next conveys and blends the raw materials to the processor 10 for grinding and compacting the CGB. In this preferred embodiment, processor 10 is an extruder or expeller. The temperatures in the processor cook and help sterilize the product, and gelatinize any non-gelatinized starch added in hoppers 9. When using an extruder, the temperature is preferably between about 230–250° F.

From the processor, the product is transported along conveyor 12 under additional ingredient feeders 9 to an optional belt drier 13. After the product is dried to a desired level, the material may be transported for immediate use or conveyed through an optional conditioner or humidifier 14, densifier 15, and cooler 16. When the conditioner, densifier, and cooler are employed, the moisture content of the processed CGB should be adjusted to a level for optimum densifier performance (e.g., in this embodiment, between about 10 to 20% by weight, preferably between about 10–15%, in the conditioner). After conditioning, the processed CGB are passed into a densifier, such as a mill, grinder, breaker, crusher, press, or hay bailer to further increase the bulk density of the product. If using a mill for densification, the densified CGB is preferably cooled in a cooler 16. As shown in the Figure, a densifier bypass 17 may be provided to allow the user to select the desired treatment.

Figure 2:
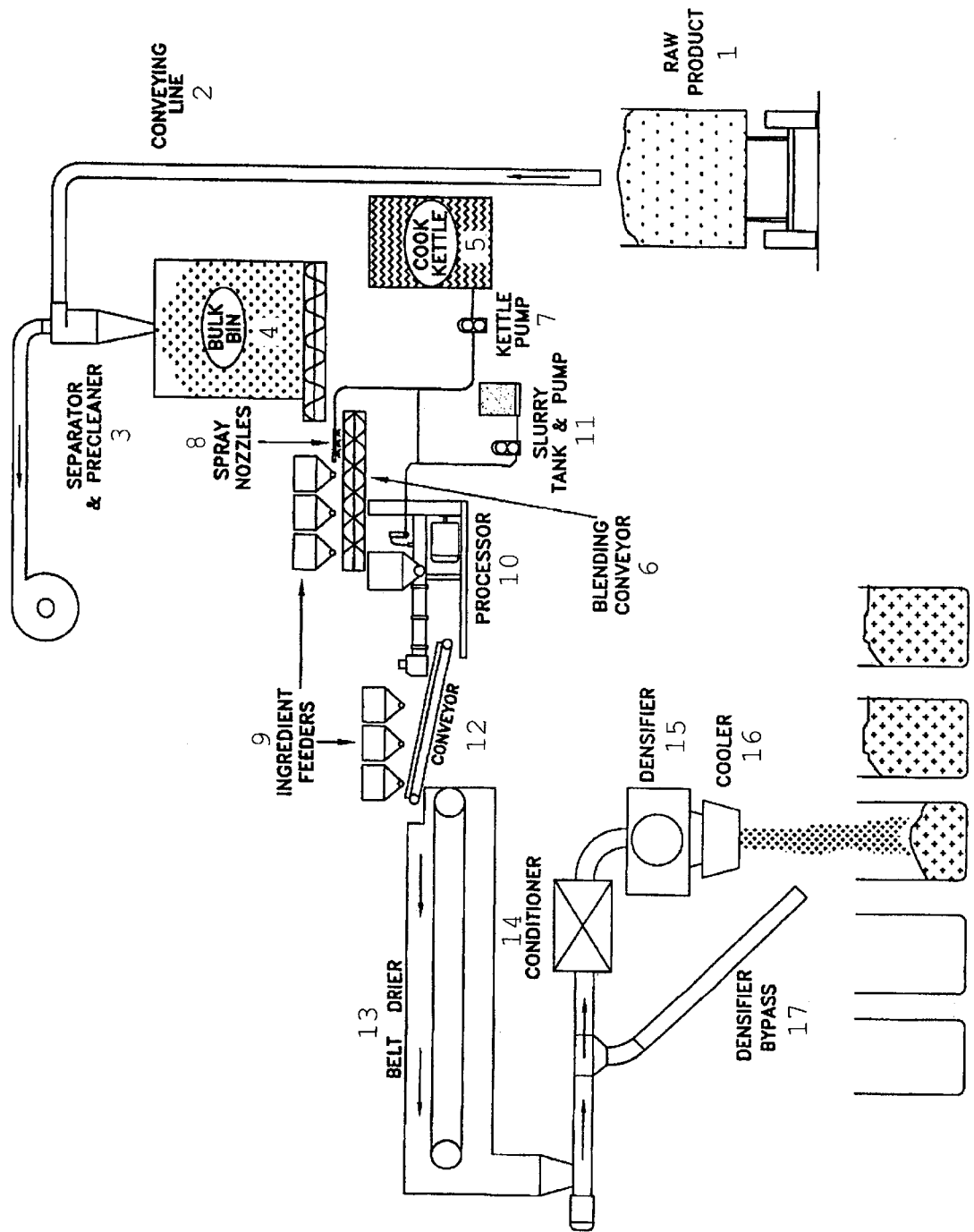
FIG. 2 shows a schematic diagram of a second preferred embodiment of the process.

FIG. 2 shows a second preferred embodiment. In this embodiment, the raw CGB are processed in the same manner as shown in FIG. 1 except that additives from slurry tank and pump 10 are added to both processor 10 and to spray nozzles 8.

It is understood that the foregoing detailed description is given merely by way of illustration and that modifications and variations may be made therein without departing from the spirit and scope of the invention.

We claim:

1. A method for treatment of cotton byproducts comprising:

a. providing a mass of cotton byproducts comprising burs;

b. treating said mass of cotton byproducts with a gellable polysaccharide selected from gelatinized polysaccharide, non-gelatinized polysaccharide, and combinations thereof; and c. grinding and compacting said mass of cotton byproducts treated with said gellable polysaccharide;

wherein said grinding and compacting further comprises heating said cotton byproducts treated with said gellable polysaccharide to a temperature effective to gelatinize said gellable polysaccharide if said polysaccharide in (a) comprises non-gelatinized polysaccharide.

2. The method of claim 1 wherein said mass of cotton byproducts is treated with an amount of said gellable polysaccharide effective to reduce the abrasiveness of said cotton byproducts following grinding and compacting relative to an untreated control.

3. The method of claim 1 wherein said polysaccharide in (b) comprises non-gelatinized polysaccharide and said grinding and compacting further comprises heating said cotton byproducts treated with said gellable polysaccharide to a temperature effective to gelatinize said gellable polysaccharide and sterilize said cotton byproducts and said gellable polysaccharide.

4. The method of claim 1 wherein said gellable polysaccharide is selected from the group consisting of starch, modified starch, cellulose, modified cellulose, and gums.

5. The method of claim 4 wherein said starch comprises flour.

6. The method of claim 4 wherein said starch is derived from wheat, oat, rye, barley, corn, tubers, potatoes or tapioca.

7. The method of claim 4 wherein said modified cellulose comprises carboxy-methylcellulose, hydroxyethylcellulose, or mixtures thereof.

8. The method of claim 4 wherein said gum comprises xanthan gum, guar gum or locust bean gum.

9. The method of claim 1 wherein said grinding and compacting comprises extruding said mass of cotton byproducts treated with said gellable polysaccharide in an extruder or expeller.

10. The method of claim 1 wherein said grinding and compacting comprises processing said mass of cotton byproducts treated with said gellable polysaccharide in a mill or grinder.

11. The method of claim 1 wherein said grinding and compacting comprises processing said mass of cotton byproducts treated with said gellable polysaccharide in a roller mill, tub grinder or hammer mill.

12. The method of claim 1 wherein said cotton byproducts comprise cotton byproducts from cotton ginning, textile milling, or oil milling.

13. The method of claim 1 wherein said mass of cotton byproducts is substantially free of dirt, sand, and rocks.

14. The method of claim 1 wherein said cotton byproducts further comprise sticks.

15. The method of claim 1 wherein said cotton byproducts comprise sticks, leaves, short staple lint, immature seeds, seed hulls, and seed coat fragments.

16. A method for treatment of cotton byproducts comprising:
    a. providing a mass of cotton byproducts comprising sticks;
    b. treating said mass of cotton byproducts with a gellable polysaccharide selected from gelatinized polysaccharide, non-gelatinized polysaccharide, and combinations thereof; and
    c. grinding and compacting said mass of cotton byproducts treated with said gellable polysaccharide;

wherein said grinding and compacting further comprises heating said cotton byproducts treated with said gellable polysaccharide to a temperature effective to gelatinize said gellable polysaccharide if said polysaccharide in (a) comprises non-gelatinized polysaccharide.

17. The method of claim 16 wherein said mass of cotton byproducts is treated with an amount of said gellable polysaccharide effective to reduce the abrasiveness of said cotton byproducts following grinding and compacting relative to an untreated control.

18. The method of claim 16 wherein said polysaccharide in (b) comprises non-gelatinized polysaccharide and said grinding and compacting further comprises heating said cotton-byproducts treated with said gellable polysaccharide to a temperature effective to gelatinize said gellable polysaccharide and sterilize said cotton byproducts and said gellable polysaccharide.

19. The method of claim 16 wherein said gellable polysaccharide is selected from the group consisting of starch, modified starch, cellulose, modified cellulose, and gums.

20. The method of claim 16 wherein said grinding and compacting comprises extruding said mass of cotton byproducts treated with said gellable polysaccharide in an extruder or expeller.

21. The method of claim 16 wherein said grinding and compacting comprises processing said mass of cotton byproducts treated with said gellable polysaccharide in a mill or grinder.

\* \* \* \* \*